United States Patent
Suzuki

(10) Patent No.: US 8,401,524 B2
(45) Date of Patent: *Mar. 19, 2013

(54) MAIL OPERATING DEVICE AND METHOD FOR CONTROLLING TRANSMISSION OF MAIL INFORMATION

(75) Inventor: Hideaki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 439 days.

This patent is subject to a terminal disclaimer.

(21) Appl. No.: 12/661,839

(22) Filed: Mar. 25, 2010

(65) Prior Publication Data

US 2010/0248693 A1    Sep. 30, 2010

(30) Foreign Application Priority Data

Mar. 26, 2009   (JP) .................................. 2009-076308

(51) Int. Cl.
H04M 1/725   (2006.01)

(52) U.S. Cl. .................. 455/412.1; 455/414.1; 455/418; 455/422.1; 455/466

(58) Field of Classification Search ............... 455/412.1, 455/414.1, 418, 422.1, 466
See application file for complete search history.

(56) References Cited

U.S. PATENT DOCUMENTS

| | | | |
|---|---|---|---|
| 6,393,463 B1 * | 5/2002 | Fuchigami | 709/206 |
| 7,107,314 B2 | 9/2006 | Cox | |
| 7,324,806 B2 * | 1/2008 | Tomita | 455/411 |
| 7,353,257 B2 | 4/2008 | Pettigrew et al. | |
| 2004/0192260 A1 | 9/2004 | Sugimoto et al. | |
| 2010/0248694 A1 * | 9/2010 | Suzuki | 455/413 |

FOREIGN PATENT DOCUMENTS

| | | |
|---|---|---|
| CN | 1250288 | 4/2000 |
| CN | 101350839 | 1/2009 |
| JP | 05-122757 | 5/1993 |
| JP | 10-224859 | 8/1998 |
| JP | 2003-032363 | 1/2003 |
| JP | 2003-256341 | 9/2003 |
| JP | 2005-284395 | 10/2005 |
| JP | 2005-293206 | 10/2005 |
| JP | 2008-310583 | 12/2008 |
| TW | I266994 | 11/2006 |

OTHER PUBLICATIONS

Office Action dated Nov. 22, 2011 in corresponding Japanese Application No. 2009-076308.
Office Action dated Jan. 18, 2011 in corresponding Japanese Application No. 2009-076308, with English translation thereof.
Office Action dated Jul. 25, 2012 from corresponding Chinese Application No. 201010149279.1 with English translation thereof.

* cited by examiner

Primary Examiner — Nghi H Ly
(74) Attorney, Agent, or Firm — Harness, Dickey & Pierce, PLC

(57) ABSTRACT

A cellular phone device stores mail information related to an electronic mail exchanged with a communication network. A communication unit is configured to connect with the cellular phone device via a wireless communication. Immediately after connection of the wireless communication between the communication unit and the cellular phone device, a receiving unit receives specific mail information among mail information stored in the cellular phone device. The specific mail information is related to an electronic mail exchanged in a time period between previous disconnection from the cellular phone device and present connection with the cellular phone device.

9 Claims, 5 Drawing Sheets

FIG. 2

| CELLULAR PHONE DEVICE | INCOMING MAIL INFORMATION |
|---|---|
| CELLULAR PHONE DEVICE A | SUBJECT 1 (INCOMING DATE/TIME, SENDER, NAME, TEXT) |
| | SUBJECT 2 (INCOMING DATE/TIME, SENDER, NAME, TEXT) |
| | SUBJECT 3 (INCOMING DATE/TIME, SENDER, NAME, TEXT) |
| | ⋮ |
| | SUBJECT na (INCOMING DATE/TIME, SENDER, NAME, TEXT) |
| CELLULAR PHONE DEVICE B | SUBJECT 1 (INCOMING DATE/TIME, SENDER, NAME, TEXT) |
| | SUBJECT 2 (INCOMING DATE/TIME, SENDER, NAME, TEXT) |
| | SUBJECT 3 (INCOMING DATE/TIME, SENDER, NAME, TEXT) |
| | ⋮ |
| | SUBJECT nb (INCOMING DATE/TIME, SENDER, NAME, TEXT) |
| ⋮ | ⋮ |
| CELLULAR PHONE DEVICE N | SUBJECT 1 (INCOMING DATE/TIME, SENDER, NAME, TEXT) |
| | SUBJECT 2 (INCOMING DATE/TIME, SENDER, NAME, TEXT) |
| | SUBJECT 3 (INCOMING DATE/TIME, SENDER, NAME, TEXT) |
| | ⋮ |
| | SUBJECT nn (INCOMING DATE/TIME, SENDER, NAME, TEXT) |

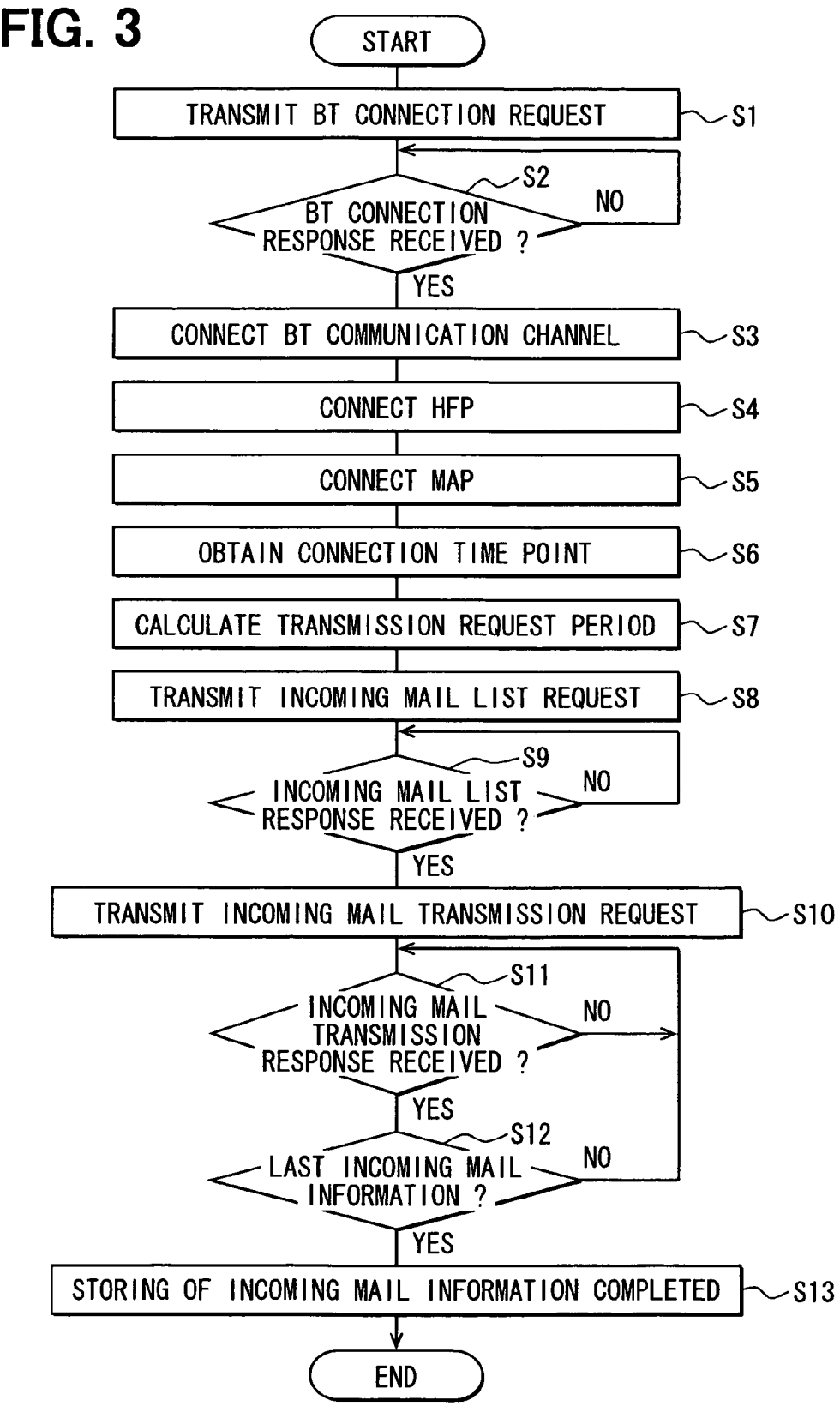

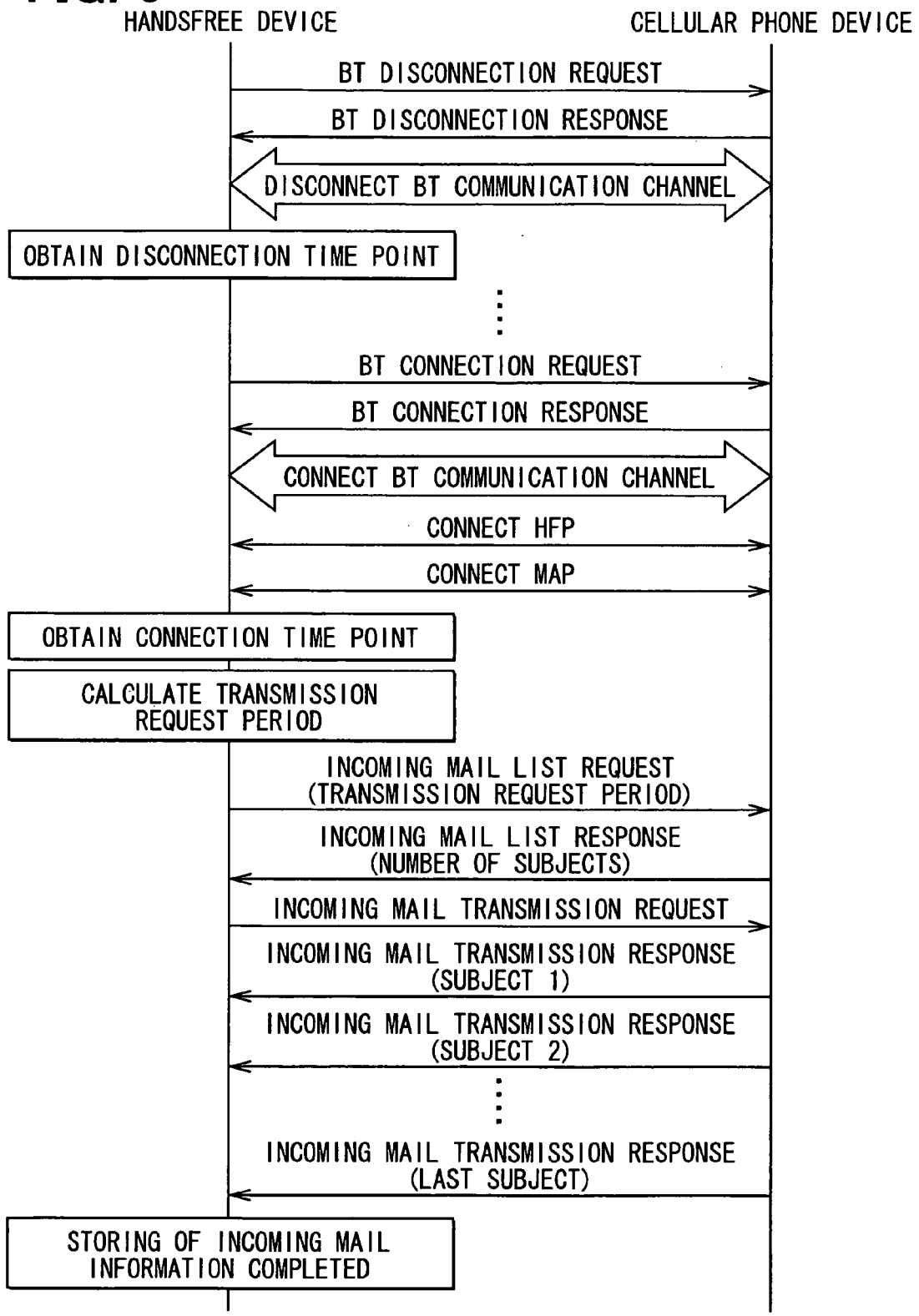

MAIL OPERATING DEVICE AND METHOD FOR CONTROLLING TRANSMISSION OF MAIL INFORMATION

CROSS REFERENCE TO RELATED APPLICATIONS

This application is based on and incorporates herein by reference Japanese Patent Application No. 2009-76308 filed on Mar. 26, 2009.

FIELD OF THE INVENTION

The present invention relates to a mail operating device having a wireless communication function. The present invention further relates to a method for controlling transmission of mail information.

BACKGROUND OF THE INVENTION

For example, JP-A-2003-256341 discloses a cellular phone device having a Bluetooth (BT: registered trademark) communication function. The cellular phone device is carried into a vehicle equipped with an in-vehicle apparatus having a BT communication function. When the cellular phone device receives an incoming mail from a communication network in a state where the cellular phone device is connecting to the in-vehicle apparatus via a BT communication, the cellular phone device transmits mail information related to an received e-mail, such as an incoming date, an incoming time, a sender, a subject name, a text, and the like. In the structure of JP-A-2003-256341, connection between the cellular phone device and the in-vehicle apparatus via the BT communication channel suffices a condition that the cellular phone device transmits the mail information, which is related to an e-mail received by the cellular phone device from the communication network, to the in-vehicle apparatus. By the transmission of the mal information, the mail information is synchronized between the cellular phone device and the in-vehicle apparatus. That is, a memory content of the cellular phone device is equalized to a memory content of the in-vehicle apparatus. Consequently, a user can use the mail information, which is related to an e-mail received by the cellular phone device from the communication network during connection of the BT communication channel, on the in-vehicle apparatus. Specifically, the user can cause the in-vehicle apparatus to indicate a text or a list of subject names included in the mail information.

However, in the structure of JP-A-2003-256341, the mail information related to an e-mail, which is received by the cellular phone device from the communication network during disconnection of the BT communication channel, is not synchronized between the cellular phone device and the in-vehicle apparatus. Accordingly, a user cannot use the mail information related to an e-mail, which is received by the cellular phone device from the communication network during disconnection of the BT communication channel, on the in-vehicle apparatus. So as to solve such a problem, it is conceivable that the cellular phone device transmits all the mail information stored in the cellular phone device to the in-vehicle apparatus immediately after the cellular phone device connects with the in-vehicle apparatus via the BT communication channel. However, when the cellular phone device transmits all the mail information stored in the cellular phone device, the transmission of all the mail information takes a long time.

SUMMARY OF THE INVENTION

In view of the foregoing and other problems, it is an object of the present invention to produce a mail operating device having a wireless communication function, the mail operating device configured to enable a user to use mail information on the mail operating device, the mail information being related to an e-mail exchanged between the cellular phone device and a communication network during disconnection of a near-field wireless communication channel with the cellular phone device. It is another object of the present invention to produce a mail operating device capable of enhancing an operativity thereof. It is another object of the present invention to produce a mail operating device configured to restrict a time required for transmitting mail information from the cellular phone device to the mail operating device. It is another object of the present invention to produce a method for controlling transmission of the mail information.

According to one aspect of the present invention, a mail operating device configured to communicate with a cellular phone device storing mail information related to an electronic mail exchanged with a communication network, the mail operating device comprises a communication unit configured to connect with the cellular phone device via a near-field wireless communication channel. The mail operating device further comprises a receiving unit configured to receive mail information from the cellular phone device. The mail operating device further comprises a storing unit configured to store mail information received by the receiving unit. The mail operating device further comprises an operation accepting unit configured to accept an user's operation to mail information stored in the storing unit. The mail operating device further comprises a first obtaining unit configured to obtain a connection time point at which the communication unit connects with the cellular phone device via the near-field wireless communication channel. The mail operating device further comprises a second obtaining unit configured to obtain a disconnection time point at which the communication unit is disconnected from the cellular phone device. The mail operating device further comprises a control unit configured to: cause the receiving unit to receive specific mail information among mail information stored in the cellular phone device immediately after the communication unit connects with the cellular phone device via the near-field wireless communication channel, the specific mail information being related to an electronic mail exchanged with the communication network in a time period from a previous disconnection time point, which is obtained by the second obtaining unit on a previous disconnection of the near-field wireless communication channel, to a present connection time point, which is obtained by the first obtaining unit on a present connection of the near-field wireless communication channel; cause the storing unit to store the specific mail, information received by the receiving unit; and process the specific mail information stored in the storing unit according to a user's operation accepted by the operation accepting unit.

According to another aspect of the present invention, a method for controlling transmission of mail information, the method comprises disconnecting a near-field wireless communication channel between a mail operating device and a cellular phone device. The method further comprises obtaining a time point as a previous disconnection time point in response to the disconnecting. The method further comprises connecting the near-field wireless communication channel between the mail operating device and the cellular phone device. The method further comprises obtaining a time point as a present connection time point in response to the connecting. The method further comprises causing the cellular phone device to transmit specific mail information among all mail information stored in the cellular phone device to the mail operating device in response to the connecting, the specific mail information being related to an electronic mail exchanged between the cellular phone device and a communication network in a time period from the previous disconnection time point to the present connection time point.

BRIEF DESCRIPTION OF THE DRAWINGS

The above and other objects, features and advantages of the present invention will become more apparent from the following detailed description made with reference to the accompanying drawings. In the drawings:

FIG. 2 is a diagram showing an incoming mail information storage region of a storage unit;

FIG. 3 is a flow chart showing one example of a near-field wireless communication channel connecting operation;

FIG. 5 is a sequence chart showing an operation performed by the mail operating device and the cellular phone device therebetween.

DETAILED DESCRIPTION OF PREFERRED EMBODIMENTS

Figure 1:
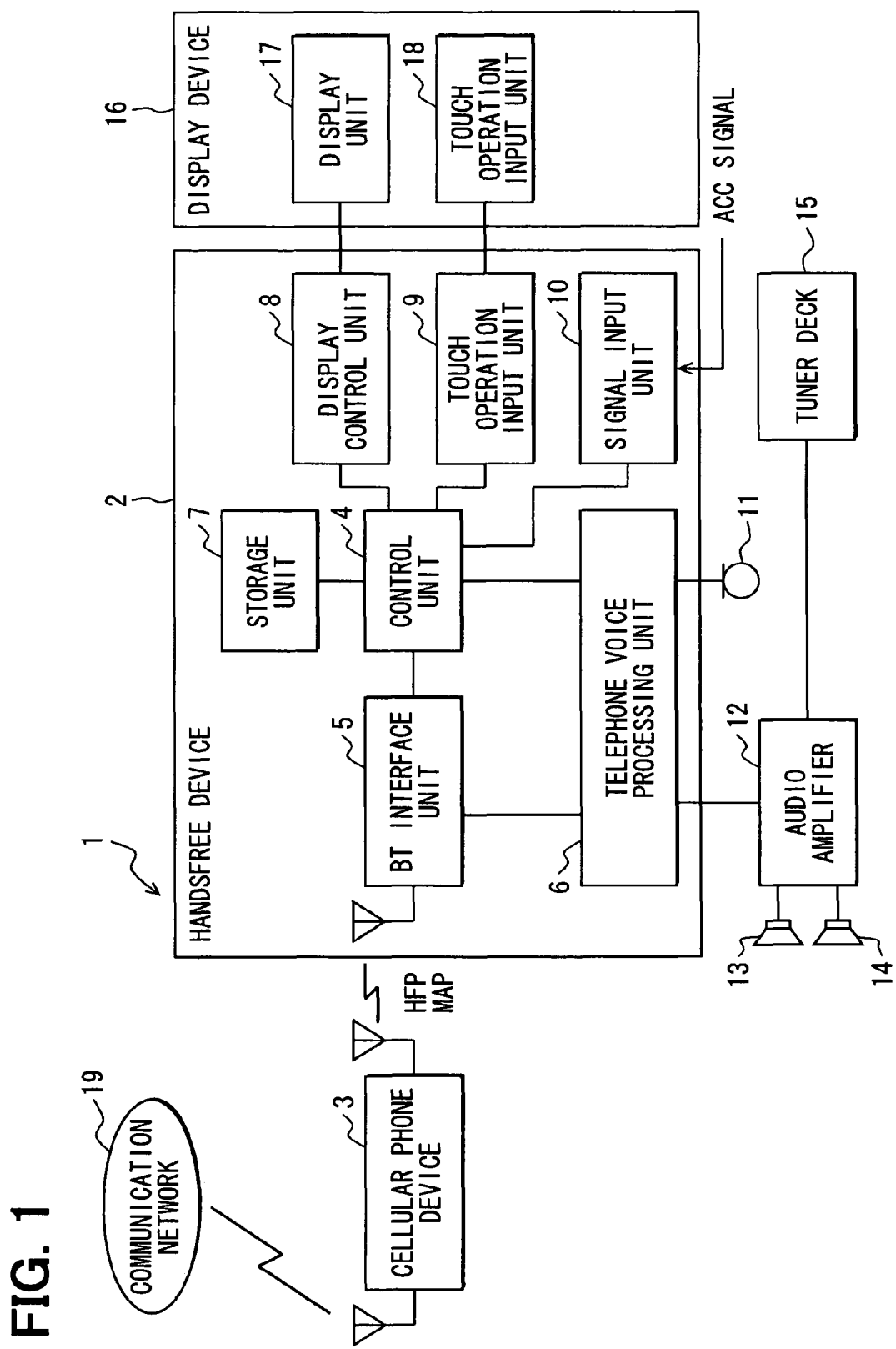
FIG. 1 is a functional block diagram showing a mail operating device and a cellular phone device according to an embodiment of the present invention.

As follows, one embodiment of a mail operating device having a near-field wireless communication function will be described with reference to drawings. The mail operating device is applied to an in-vehicle handsfree device having a Bluetooth (BT: registered trademark) communication function. In the present description, a cellular phone device having a BT communication function is carried in an interior of a vehicle equipped with the in-vehicle handsfree device. In addition, the in-vehicle handsfree device and the cellular phone device are in BT communication via the BT communication function.

An in-vehicle handsfree system 1 includes an in-vehicle handsfree device 2 and a cellular phone device 3. The in-vehicle handsfree device 2 includes a control unit 4, a BT interface (IF) unit 5, a telephone voice processing unit 6, a storage unit 7, a display control unit 8, a touch operation input unit 9, and a signal input unit 10. The control unit 4 is an example of an operation accepting unit, a control unit, a connection time point obtaining unit (first obtaining unit), and a disconnection time point obtaining unit (second obtaining unit). The BT interface unit 5 is an example of a communication unit and a mail information receiving unit. The storage unit 7 is one example of a mail information storing unit.

The control unit 4 may be a generally-known microcomputer including a CPU, a RAM, a ROM, an I/O bus, and the like. The control unit 4 controls an operation such as a communication and an information management of the in-vehicle handsfree device 2. The BT interface unit 5 has a function to perform a BT communication with each cellular phone device 3 of cellular phone devices 3. Specifically, the BT interface unit 5 is configured to perform a concurrent connection (multi-connection) with the cellular phone devices 3 via a handsfree profile (HFP) and a message access profile (MAP) when connecting with the cellular phone devices 3 through a BT communication channel (near-field wireless communication channel). The handsfree profile (HFP) and the message access profile (MAP) are defined by a communication standard of the Bluetooth. The handsfree profile (HFP) is used for carrying out the handsfree communication. The message access profile (MAP) is used for carrying out transmission of mail information related to an e-mail.

The e-mail (electronic mail) is a general term of information such as a character message and image information exchanged via a generally-known computer network. In addition to the HFP and the MAP, the BT interface unit 5 are further configured to use the phone book access profile (PBAP), the object push profile (OPP), and the like. The phone book access profile (PBAP) is used for transmission of telephone directory information, outgoing history information, and incoming history information. The object push profile (OPP) is used for transfer of various information. The present profiles are communication protocols assigned respectively to functions.

The telephone voice processing unit 6 is connected with a microphone 11 and an audio amplifier 12. The microphone 11 is located in the vehicle interior. More specifically, for example, the microphone 11 is located at a position, for example, close to a handle, such that the microphone 11 can easily collect voice of a user. The audio amplifier 12 is an exterior device of the in-vehicle handsfree device 2 and connected with two speakers 13 and 14. For example, the speaker 13 is located at a door of a driver's seat, and the speaker 14 is located at a door of a passenger's seat. The audio amplifier 12 is further connected with a tuner deck 15. For example, the audio amplifier 12 inputs an audio signal of audio contents such as a music content obtained from a recording medium and a radio program received from a radio station using the tuner deck 15. The audio amplifier 12 amplifies the audio signal and outputs the audio contents via the speakers 13 and 14.

The storage unit 7 is configured to store various information. Specifically, the storage unit 7 has incoming mail information storage regions and outgoing mail information storage regions correspondingly to multiple cellular phone devices 3, which are connectable with the BT interface unit 5 via the BT communication channel. The incoming mail information storage regions are for storing incoming mail information related to an incoming mail. The incoming mail is an e-mail received by each of (at lest one of) the cellular phone devices 3 from a communication network 19. The outgoing mail information storage regions are for storing outgoing mail information related to an outgoing mail. The outgoing mail is an e-mail transmitted by the cellular phone device 3 to the communication network 19.

As shown in FIG. 2, the incoming mail information storage regions are prepared correspondingly by the number of cellular phone devices 3, which are connectable with the BT interface unit 5 via the BT communication channel. The incoming mail information stored in the incoming mail information storage region includes an incoming date, an incoming time, a sender, a subject name, and a text of an e-mail received by the cellular phone device 3 from the communication network 19. In FIG. 2, a cellular phone device A has a memory for the incoming mail information capable of including the number na of subjects at maximum. In addition, a cellular phone device B has a memory for the incoming mail information capable of including the number nb of subjects at maximum. Further, a cellular phone device N has a memory for the incoming mail information capable of including the number nn of subjects at maximum. It is noted that, the number of subjects to be included in the memory for the incoming mail information of each cellular phone device 3 may be a fixed value and may be a variable value. Alternatively, the number of subjects to be included in the memory for the incoming mail information of each cellular phone device 3 may be the number of subjects, which the specification of the cellular phone device 3 permits to store.

Similarly to the incoming mail information storage regions, the outgoing mail information storage regions are prepared correspondingly by the number of cellular phone devices 3, which are connectable with the BT interface unit 5 via the BT communication channel. The outgoing mail information stored in the outgoing mail information storage region includes an outgoing date, an outgoing time, a destination, a subject name, and a text of the e-mail transmitted from the cellular phone device 3 to the communication network 19. The number of subjects to be included in the memory for the outgoing mail information of each cellular phone device 3 may, be a fixed value and may be a variable value. Alternatively, the number of subjects to be included in the memory for the outgoing mail information of each cellular phone device 3 may be the number of subjects, which the specification of the cellular phone device 3 permits to store.

As described above, the storage unit 7 has the incoming mail information storage region for storing the incoming mail information and the outgoing mail information storage region for storing the outgoing mail information. In addition, the storage unit 7 may further has, for example, a telephone directory information storage region, an outgoing history information storage region, an incoming history information storage region, and the like. The telephone directory information storage region stores telephone directory information specifying a correspondence between a telephone number and a registered name. The outgoing history information storage region stores outgoing history information specifying a correspondence between an outgoing time and an outgoing telephone number related to an outgoing operation (transmission) from the in-vehicle handsfree device 2 or an outgoing operation from the cellular phone device 3 connecting with the in-vehicle handsfree device 2 via the HFP. The incoming history information storage region stores incoming history information specifying a correspondence between an incoming time and an incoming telephone number related to an incoming operation (reception) of the cellular phone device 3 connected with the in-vehicle handsfree device 2 via the HFP.

The signal input unit 10 inputs an accessory signal (ACC signal) from a security device such as a key switch, a push button for activating the vehicle, or another activating unit. When the control unit 4 inputs the ACC signal at the high level (ON) from the security device, the control unit 4 determines the in-vehicle handsfree device 2 to be in an activated state. Thus, the control unit 4 causes an in-vehicle battery to supply electricity to all functional blocks so as to perform a normal operation in a wake-up state. Alternatively, when the control unit 4 inputs the ACC signal at the low level (OFF) from the security device, the control unit 4 determines the in-vehicle handsfree device 2 to be substantially in a deactivated state. Thus, the control unit 4 causes the in-vehicle battery to supply electricity to limited functional blocks so as to perform a low-power-consumption operation in a sleep state.

A display device 16 includes a display unit 17 and a touch operation input unit 18. The display unit 17 displays various information. The touch operation input unit 18 has a touch sensor on a display screen. The display control unit 8 inputs an instruction from the control unit 4 and controls indication of information on the display unit 17 of the display device 16 based on the inputted instruction. The touch operation input unit 9 inputs instruction of a user according to a user's operation of the touch sensor of the touch operation input unit 18 via the display screen. The touch operation input unit 9 outputs the inputted instruction to the control unit 4. The control unit 4 analyzes the instruction inputted from the touch operation input unit 9.

In the present structure, the incoming mail information storage region and the outgoing mail information storage region of the storage unit 7 are a nonvolatile. For example, the control unit 4 terminates electric power supply, when the control unit 4 determines that the ACC signal inputted from the security device is deactivated in response to an operation of, for example, rotation of an ignition key to an OFF position when a user goes out of the vehicle. Even in this case, the incoming mail information stored in the incoming mail information storage region and the outgoing mail information stored in the outgoing mail information storage region in a state immediately before the determination of the deactivation of the ACC signal are not deleted, and a memory state thereof is maintained.

Further, the control unit 4 analyzes operation information related to an operation by a user and detected by the touch operation input unit 9. The control unit 4 determines whether a user performs an operation to indicate a text or a list of subject names, which is included in the mail information stored in the storage unit 7, via the touch operation input unit 18 according to the analyzed operation information. When the control unit 4 determines that a user performs the operation via the touch operation input unit 18, the control unit 4 outputs an indication instruction to the display control unit 8 according to the analyzed operation information. Thus, the control unit 4 causes the display device 16 to indicate the text or the list of the subject names, which is included in the mail information and specified by the user.

The cellular phone device 3 includes a control unit, a telecommunication unit, a BT interface unit, a key unit, a storage unit, a display unit, a microphone, a speaker, and the like. The control unit controls an entire operation of the cellular phone device 3. The telecommunication unit performs telephonic communications with the communication network 19. The BT interface unit performs the BT communication. The key unit includes various keys manipulated by a user. The storage unit has an incoming mail information storage region, an outgoing mail information storage region, a telephone directory information storage region, and the like. The incoming mail information storage region is for storing incoming mail information related to an incoming mail (e-mail) received by the cellular phone device 3 from the communication network 19. The outgoing mail information storage region is for storing outgoing mail information related to an outgoing mail (e-mail) transmitted from the cellular phone device 3 to the communication network 19. The telephone directory information storage region indicates a correspondence between a telephone number and a registered name. The display unit indicates various kinds of display screens. The microphone inputs a voice of a user. The speaker outputs a voice received from a counterpart as an incoming voice.

In the present embodiment, the BT interface unit of the cellular phone device 3 has a function to perform the BT communication with the in-vehicle handsfree device 2. Similarly to the BT interface unit 5 of the in-vehicle handsfree device 2, the BT interface unit of the cellular phone device 3 can communicate simultaneously using the HFP and the MAP. The communication network 19 includes a cellular-phone base station and a facility, which provides a generally-known communication service, such as a base station control, for a cellular phone.

Figure 4:
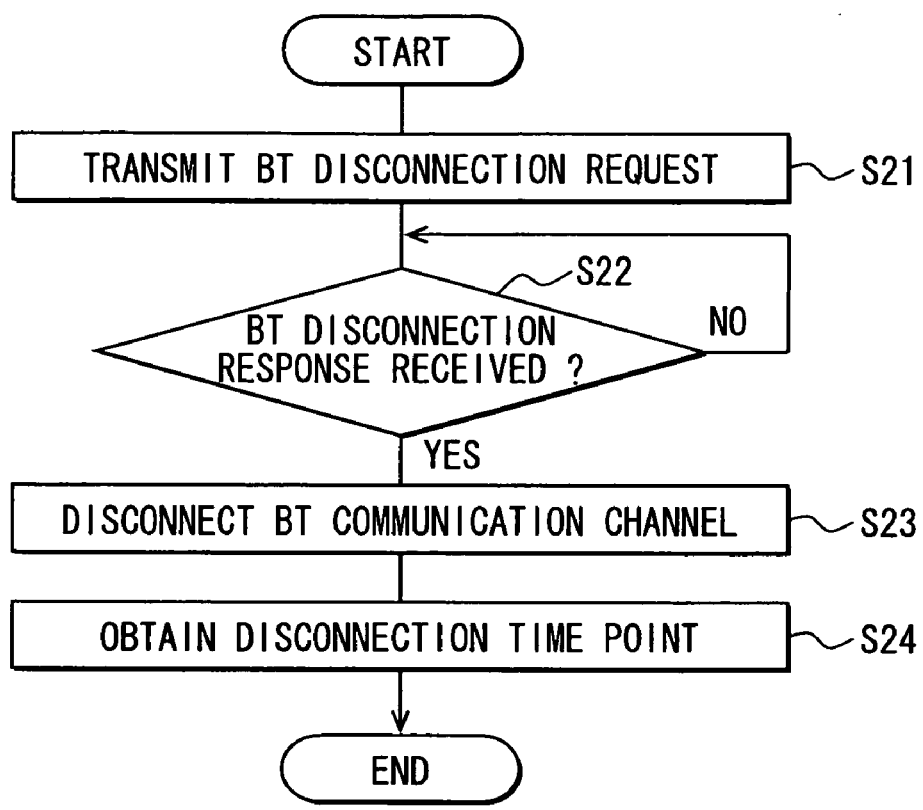
FIG. 4 is a flow chart showing one example of a near-field wireless communication channel disconnecting operation.

As follows, an operation of the above-described configuration will be described with reference to FIGS. 3 to 5. FIG. 3 is a flow chart showing a BT communication channel connecting operation of the in-vehicle handsfree device 2. FIG. 4 is a flow chart showing a BT communication channel disconnecting operation of the in-vehicle handsfree device 2. FIG. 5 is a sequence chart showing an operation performed by the cellular phone device 3 and the in-vehicle handsfree device 2 therebetween. As follows, one example of transmission of the incoming mail information will be described. In the present one example, the incoming mail information stored in the cellular phone device 3 is transmitted from the cellular phone device 3 to the in-vehicle handsfree device 2 when the cellular phone device 3 is connected with the in-vehicle handsfree device 2 via the BT communication channel.

(1) BT Communication Channel Connecting Operation

In the in-vehicle handsfree device 2, the control unit 4 periodically determines in a main operation whether a connection request of the BT communication channel with the cellular phone device 3 occurs. When the control unit 4 determines that a connection request of the BT communication channel with the cellular phone device 3 occurs, the control unit 4 starts execution of an interrupt process of the BT communication channel connecting operation shown in FIG. 3.

Subsequent to start of the BT communication channel connecting operation, at step S1, the control unit 4 causes the BT interface unit 5 to transmit a BT connection request to the cellular phone device 3. At step S2, the control unit 4 waits reception of a BT connection response from the cellular phone device 3 via the BT interface unit 5. At step S2, when the control unit 4 determines that the BT interface unit 5 receives an identifiable BT connection response from the cellular phone device 3, step S2 makes a positive determination. The identifiable BT connection response includes, for example, identification information such as a BT address. When step S2 makes a positive determination, at step S3, the control unit 4 causes the BT interface unit 5 and the cellular phone device 3 to establish a BT communication channel connection therebetween, i.e., to connect the BT communication channel. Further, at step S4, the control unit 4 causes the BT interface unit 5 and the cellular phone device 3 to establish an HFP connection therebetween for performing a handsfree communication. Further, at step S5, the control unit 4 causes the BT interface unit 5 and the cellular phone device 3 to establish an MAP connection therebetween for performing a mail transfer operation. In this case, the control unit 4 analyzes the identification information contained in the BT connection response to identify the cellular phone device 3 as a connection partner of the BT communication channel.

Subsequently, at step S6, the control unit 4 obtains a time value of an activated timer unit at the time point as a connection completion time point (connection time point). At step S7, the control unit 4 calculates a transmission request period by subtracting a previous disconnection completion time point (disconnection time point), when disconnecting a previous BT communication channel, from the presently obtained connection completion time point when presently connecting the BT communication channel. The time difference calculated by subtracting the disconnection completion time point from the connection completion time point is equivalent to an immediately preceding time period in which the cellular phone device 3 and the in-vehicle handsfree device 2 do not connect the BT communication channel therebetween.

Subsequently, at step S8, the control unit 4 causes the BT interface unit 5 to transmit an incoming mail list request, which includes the transmission request period calculated in this way, to the cellular phone device 3. At step S9, the control unit 4 waits that the BT interface unit 5 receives an incoming mail list response from the cellular phone device 3. When the cellular phone device 3 receives the incoming mail list request transmitted from the in-vehicle handsfree device 2, the cellular phone device 3 obtains the number of subjects of the incoming mail information received from the communication network 19 during the transmission request period. In this state, the cellular phone device 3 obtains the number of subjects of the incoming mail information from the incoming mail information stored in the incoming mail information storage region at the time point; with reference to the incoming mail information storage region of the storage unit of the cellular phone device 3 at the time point. Subsequently, the cellular phone device 3 transmits an incoming mail list response, which includes the number of subjects in the obtained transmission request period, to the in-vehicle handsfree device 2.

When the control unit 4 determines that the control unit 4 receives an incoming mail list response from the cellular phone device 3 via the BT interface unit 5, step S9 makes a positive determination. In this case, at step S10, the control unit 4 stores the number of subjects contained in the incoming mail list response and causes the BT interface unit 5 to transmit an incoming mail transmission request to the cellular phone device 3. At step S11, the control unit 4 waits that the BT interface unit 5 receives an incoming mail transmission response from the cellular phone device 3. The cellular phone device 3 receives the incoming mail transmission request transmitted from the in-vehicle handsfree device 2 in this way. In response to the incoming mail transmission request, the cellular phone device 3 transmits all the incoming mails in the transmission request period, which is included in the incoming mail information stored in the incoming mail information storage region of the storage unit of the cellular phone device 3 at the time point, to the in-vehicle handsfree device 2. The cellular phone device 3 transmits the incoming mail transmission response including the incoming mail information related to all the incoming mails, which respectively correspond to subjects in the transmission request period, in order from the newest subject according to the incoming date and time, for example.

At step S11, when the control unit 4 determines that the BT interface unit 5 receives an incoming mail transmission response, which includes incoming mail information on one subject, from the cellular phone device 3, step S11 makes a positive determination. In this case, at step S12, the control unit 4 causes the incoming mail information storage region of the storage unit 7 to store the incoming mail information on the one subject included in the incoming mail transmission response. Further, the control unit 4 compares the order of the one subject included in the incoming mail transmission response with the previously stored total number of the subjects. Thus, the control unit 4 determines whether the present incoming mail transmission response includes the last incoming mail information.

At step S12, when the control unit 4 determines that the incoming mail transmission response does not include the last incoming mail information, step S12 makes a negative determination. In this case, the processing returns to step S11, and the above-described processings are repeated. Alternatively, when the control unit 4 determines that the incoming mail transmission response includes the last incoming mail information, step S12 makes a positive determination. In this case, at step S13, the control unit 4 completes the storing operation to cause the incoming mail information storage region to store the incoming mail information. Thus, the control unit 4 terminates the BT communication channel connecting operation and returns to the main operation.

In the present operation, the control unit 4 causes the BT interface unit 5 and the cellular phone device 3 to connect the BT communication channel therebetween. Immediately after the connection, the control unit 4 causes the cellular phone device 3 to selectively transmit incoming mail information received by the cellular phone device 3 from the communication network 19 in the period, which is from the time point of previous disconnection of the BT communication channel to the time point of present connection of the BT communication channel, among the incoming mail information stored in the incoming mail information storage region of the storage unit of the cellular phone device 3 connecting the BT communication channel. The control unit 4 causes the incoming mail information storage region of the storage unit 7 to store the transmitted incoming mail information. Thereby, the control unit 4 synchronizes the incoming mail information related to incoming mails received by the cellular phone device 3 from the communication network 19 in a time period in which the in-vehicle handsfree device 2 does not connect the BT communication channel with the cellular phone device 3.

After completion of transmission of the incoming mail information from the cellular phone device 3 to the in-vehicle handsfree device 2, a user can obtain the incoming mail information related to incoming mails received by the cellular phone device 3 from the communication network 19 in the transmission request period, in which the cellular phone device 3 and the in-vehicle handsfree device 2 do not connect the BT communication channel therebetween. Specifically, the use may cause the display device 16 to indicate a text or a list of subject names of the incoming mail information related to incoming mails in the transmission request period, by, for example, manipulating the touch operation input unit 18 of the in-vehicle handsfree device 2. The transmission of the incoming mail information from the cellular phone device 3 to the in-vehicle handsfree device 2 may be performed by using MAP and may be performed by using a data transfer function of HFP.

(2) BT Communication Channel Disconnecting Operation

In the in-vehicle handsfree device 2, the control unit 4 periodically determines in the main operation whether a disconnection request of a presently connecting BT communication channel with the cellular phone device 3 occurs. When the control unit 4 determines that a disconnection request of the BT communication channel with the cellular phone device 3 occurs, the control unit 4 starts execution of an interrupt process of the BT communication channel disconnecting operation shown in FIG. 4.

Subsequent to start of the BT communication channel disconnecting operation, at step S21, the control unit 4 causes the BT interface unit 5 to transmit a BT disconnection request to the cellular phone device 3. At step S22, the control unit 4 waits reception of a BT disconnection response from the cellular phone device 3 via the BT interface unit 5. When the control unit 4 determines that the BT interface unit 5 receives a BT disconnection response, step S22 makes a positive determination. In this case, at step S23, the control unit 4 disconnects the BT communication channel, which is presently connected between the BT interface unit 5 and the cellular phone device 3. Further, at step S24, the control unit 4 obtains a time value of an activated timer unit at the time point as a disconnection completion time point (disconnection time point). Thus, the control unit 4 terminates the BT communication channel disconnecting operation and returns to the main operation.

It is conceivable that the cellular phone device 3 may receive a new incoming mail from the communication network 19, while the cellular phone device 3 is transmitting incoming mail information to the in-vehicle handsfree device 2. In this case, the control unit 4 may cause the cellular phone device 3 to resume transmission of incoming mail information, which includes incoming mail information related to the new incoming mail, to the in-vehicle handsfree device 2 from the beginning, after completion of reception of the new incoming mail.

As described above, according to the present embodiment, the in-vehicle handsfree device 2 is configured to cause the cellular phone device 3 to transmit incoming mail information received by the cellular phone device 3 from the communication network 19 in the time period, which is from the time point of disconnection of the previous BT communication channel to the time point of connection of the present BT communication channel, selectively among incoming mail information stored in the cellular phone device 3, immediately after connecting a BT communication channel with the cellular phone device 3. Thereby, incoming mail information related to an incoming mail received by the cellular phone device 3 from the communication network 19 in a time period, in which the BT communication channel is not connected, can be synchronized between the cellular phone device 3 and the in-vehicle handsfree device 2. That is, a memory content of the cellular phone device 3 can be synchronized with, i.e., made the same as a memory content of the in-vehicle handsfree device 2. Consequently, on the in-vehicle handsfree device 2, a user can use incoming mail information, which is related to an incoming mail received by the cellular phone device 3 from the communication network 19 in the time period in which the cellular phone device 3 does not connect the BT communication channel. Thus, operativity of incoming mail information and the in-vehicle handsfree device 2 can be enhanced.

In addition, incoming mail information transmitted from the cellular phone device 3 to the in-vehicle handsfree device 2 is limited to a part of incoming mail information related to an incoming mail received by the cellular phone device 3 from the communication network 19 in a time period from the time point of disconnection of the previous BT communication channel to the time point of connection of the present BT communication channel. Thereby, a time required to transmit incoming mail information from the cellular phone device 3 to the in-vehicle handsfree device 2 can be effectively reduced.

Further, the incoming mail information storage region is prepared correspondingly to each of the multiple cellular phone devices 3 connectable to a BT communication channel. Therefore, incoming mail information related to an incoming mail received by each of the multiple cellular phone devices 3 from the communication network 19 in a time period, in which the BT communication channel is not connected, can be synchronized between each of the multiple cellular phone devices 3, which is connectable with the in-vehicle handsfree device 2 via the BT communication channel, and the in-vehicle handsfree device 2.

The present invention is not limited to the embodiment, and may be transformed or extended as follows. The mail operating device having a near-field wireless communication function is not limited to the in-vehicle handsfree device 2 having the handsfree function. It suffices that the mail operating device has a function to manipulate mail information. For example, the mail operating device may be another in-vehicle apparatus, such as an in-vehicle navigation device. The mail operating device is not limited to an in-vehicle apparatus provided in a vehicle and may be a portable device configured to be carried by a user. Alternatively, the mail operating device may be a stationary equipment configured not to be carried by a user.

The transmitted information is not limited to incoming mail information related to an incoming mail received by the cellular phone device 3 from the communication network 19. The transmitted information may be outgoing mail information related to an outgoing mail transmitted from the cellular phone device 3 to the communication network 19. In this case, specifically, outgoing mail information stored in the cellular phone device 3 may be transmitted from the cellular phone device 3 to the in-vehicle handsfree device 2. Thereby, the outgoing mail information related to an outgoing mail transmitted from the cellular phone device 3 to the communication network 19 in a time period in which the BT communication channel is not connected with the cellular phone devices 3 may be synchronized. Both incoming mail information and outgoing mail information, which are stored in the cellular phone device 3, may be transmitted from the cellular phone device 3 to the in-vehicle handsfree device 2 so as to synchronize both the incoming mail information and the outgoing mail information.

It is conceivable that the cellular phone device 3 may transmit a new outgoing mail to the communication network 19, while the cellular phone device 3 is transmitting outgoing mail information to the in-vehicle handsfree device 2. In this case, the control unit 4 may cause the cellular phone device 3 to resume transmission of outgoing mail information, which includes outgoing mail information related to the new outgoing mail, to the in-vehicle handsfree device 2 from the beginning, after completion of transmission of the new outgoing mail.

Summarizing the above embodiments, immediately after a communication unit connects a near-field wireless communication channel with a cellular phone device, a control unit is configured to cause a mail information receiving unit to receive mail information, which is related to an e-mail transmitted to and received from a communication network in a time period, among mail information stored in the cellular phone device, the time period being from a time point of disconnection of a previous near-field wireless communication channel, which is obtained by a disconnection time point obtaining unit, to a time point of connection of a present near-field wireless communication channel, which is obtained by a connection time point obtaining unit. The control unit is further configured to cause a mail information storage unit to store the mail information received by the mail information receiving unit. Thereafter, the control unit performs a processing of the mail information stored in the mail information storage unit according to an operation accepted by an operation accepting unit from a user when the operation accepting unit receives the operation of the user to the mail information.

In the present structure, immediately after the communication unit and the cellular phone device connect the near-field wireless communication channel therebetween, the mail information related to the e-mail exchanged between the cellular phone device and the communication network in the time period, which is from the time point of disconnection of the previous near-field wireless communication channel to the time point of connection of the present near-field wireless communication channel, is transmitted from the cellular phone device to the mail operating device having the near-field wireless communication function. Thereby, the mail information can be synchronized between the cellular phone device and the mail operating device having the near-field wireless communication function. That is, a memory content of the cellular phone device can be equalized to a memory content of the mail operating device having the near-field wireless communication function. Consequently, a user can access the mail information on the mail operating device having the near-field wireless communication function. The mail information is related to an e-mail exchanged by the cellular phone device with the communication network in the time period in which the near-field wireless communication channel is not available with the cellular phone devices. Thus, accessibility of the mail information can be enhanced.

In addition, the mail information transmitted from the cellular phone device to the mail operating device having the near-field wireless communication function is limited to a part of mail information related to a mail received by the cellular phone device from the communication network in the time period from the time point of disconnection of the previous near-field wireless communication channel to the time point of connection of the present near-field wireless communication channel. Thereby, a time required to transmit mail information from the cellular phone device to the mail operating device having the near-field wireless communication function can be effectively reduced.

A mail information storing unit may have multiple storage areas respectively corresponding to multiple cellular phone devices each being the cellular phone device connectable with the communication unit via the near-field wireless communication channel. The control unit may be further configured to identify the cellular phone device connected with the communication unit via the near-field wireless communication channel so as to cause one of the multiple storage areas of the mail information storing unit to store the mail information received by the mail information receiving unit, the one of the multiple storage areas corresponding to the cellular phone device. In the present structure, mail information related to an e-mail exchanged between the cellular phone device and the communication network in a time period, in which connection with the cellular phone device via the near-field wireless communication channel is not available, can be synchronized between the cellular phone device and the mail operating device having the near-field wireless communication function. It is noted that the cellular phone device corresponds to each of the multiple cellular phone devices each connectable with the communication unit via the near-field wireless communication channel.

The above processings such as calculations and determinations are not limited being executed by the control unit 4 and other devices. The control unit may have various structures including the control unit 4 and other devices shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A mail operating device configured to communicate with a cellular phone device storing mail information related to electronic mail exchanged with a communication network, the mail operating device comprising:
    a communication unit configured to connect with the cellular phone device via a near-field wireless communication channel;
    a receiving unit configured to receive mail information from the cellular phone device;
    a storing unit configured to store the mail information received by the receiving unit;
    an operation accepting unit configured to accept a user's operation to the mail information stored in the storing unit;
    a first obtaining unit configured to obtain a connection time point at which the communication unit connects with the cellular phone device via the near-field wireless communication channel;
    a second obtaining unit configured to obtain a disconnection time point at which the communication unit is disconnected from the cellular phone device; and
    a control unit configured to:
        calculate, immediately after the communication unit connects with the cellular phone device via the near-field wireless communication channel, a time period, as a transmission request period, from a previous disconnection time point, which is obtained by the second obtaining unit on a previous disconnection of the near-field wireless communication channel, to a present connection time point, which is obtained by the first obtaining unit on a present connection of the near-field wireless communication channel;
        cause the cellular phone device to transmit a transmission request for specific mail information, among the mail information stored in the cellular phone device, being related to the electronic mail exchanged with the communication network during the transmission request period thereby to cause the receiving unit to receive the specific mail information transmitted from the cellular phone device;
        cause the storing unit to store the specific mail information received by the receiving unit; and
        process the specific mail information stored in the storing unit according to a user's operation accepted by the operation accepting unit.

2. The mail operating device according to claim 1, wherein the storing unit has a plurality of storage areas respectively corresponding to a plurality of cellular phone devices each being the cellular phone device connectable with the communication unit via the near-field wireless communication channel, and
    the control unit is further configured to:
        identify the cellular phone device connected with the communication unit via the near-field wireless communication channel; and
        cause the storing unit to store the mail information received by the receiving unit in one of the plurality of storage areas, which corresponds to the identified cellular phone device.

3. The mail operating device according to claim 1, wherein the mail operating device is an in-vehicle device.

4. The mail operating device according to claim 1, wherein the storing unit is configured to store the disconnection time point.

5. A method for controlling transmission of mail information, the method comprising:
    obtaining a time point as a previous disconnection time point in response to disconnection of a near-field wireless communication channel between a mail operating device and a cellular phone device;
    obtaining a time point as a present connection time point in response to connection of the near-field wireless communication channel between the mail operating device and the cellular phone device;
    calculating, immediately after the mail operating device connects with the cellular phone device via the near-field wireless communication channel, a time period, as a transmission request period, from the obtained previous disconnection time point to the obtained present connection time point; and
    causing the cellular phone device to transmit a transmission request for specific mail information, among mail information stored in the cellular phone device, being related to electronic mail exchanged with a communication network in the transmission request period thereby to cause the mail operating device to receive the specific mail information transmitted from the cellular phone device.

6. The method according to claim 5, further comprising:
    storing the transmitted specific mail information in a storing unit;
    accepting a user's operation to the stored specific mail information via an operation accepting unit; and
    processing the stored specific mail information according to the accepted user's operation.

7. A non-transitory computer readable medium comprising instructions executed by a computer, the instructions including the method according to claim 5.

8. The method according to claim 5, wherein the mail operating device is an in-vehicle device.

9. The method according to claim 5, further comprising storing the time point of the previous disconnection time point.

* * * * *